(12) United States Patent  
Wurzbarger

(10) Patent No.: US 7,513,987 B1  
(45) Date of Patent: Apr. 7, 2009

(54) HIGH MOLECULAR WEIGHT IONIZED WATER

(76) Inventor: Stephen Ray Wurzbarger, P.O. Box C, Goodyear Bar, CA (US) 95944

( * ) Notice: Subject to any disclaimer, the term of this patent is extended or adjusted under 35 U.S.C. 154(b) by 741 days.

(21) Appl. No.: 10/803,678

(22) Filed: Mar. 18, 2004

Related U.S. Application Data

(63) Continuation-in-part of application No. 10/117,878, filed on Apr. 6, 2002, now abandoned.

(51) Int. Cl.  
*C02F 1/461* (2006.01)

(52) U.S. Cl. ........................................ 205/687; 205/742

(58) Field of Classification Search ................. 205/687, 205/742  
See application file for complete search history.

(56) References Cited

U.S. PATENT DOCUMENTS 4,613,416 A * 9/1986 Kau et al. .................... 205/510

* cited by examiner

*Primary Examiner*—Arun S Phasge  
(74) *Attorney, Agent, or Firm*—Robert Samuel Smith

(57) ABSTRACT

A method for generating a multihydrated hydronium ion including the steps: agitating water to reduce cluster size, mixing sulfuric acid in the water, adding a solution containing Ca3+ ions, removing precipitated Ca sulfate, cooling the resultant liquid to a form a slush, filterin out ice from the slush, distilling free water from the remaining liquid wherein the remaining liquid is $H_9O_4^+$.

14 Claims, 9 Drawing Sheets

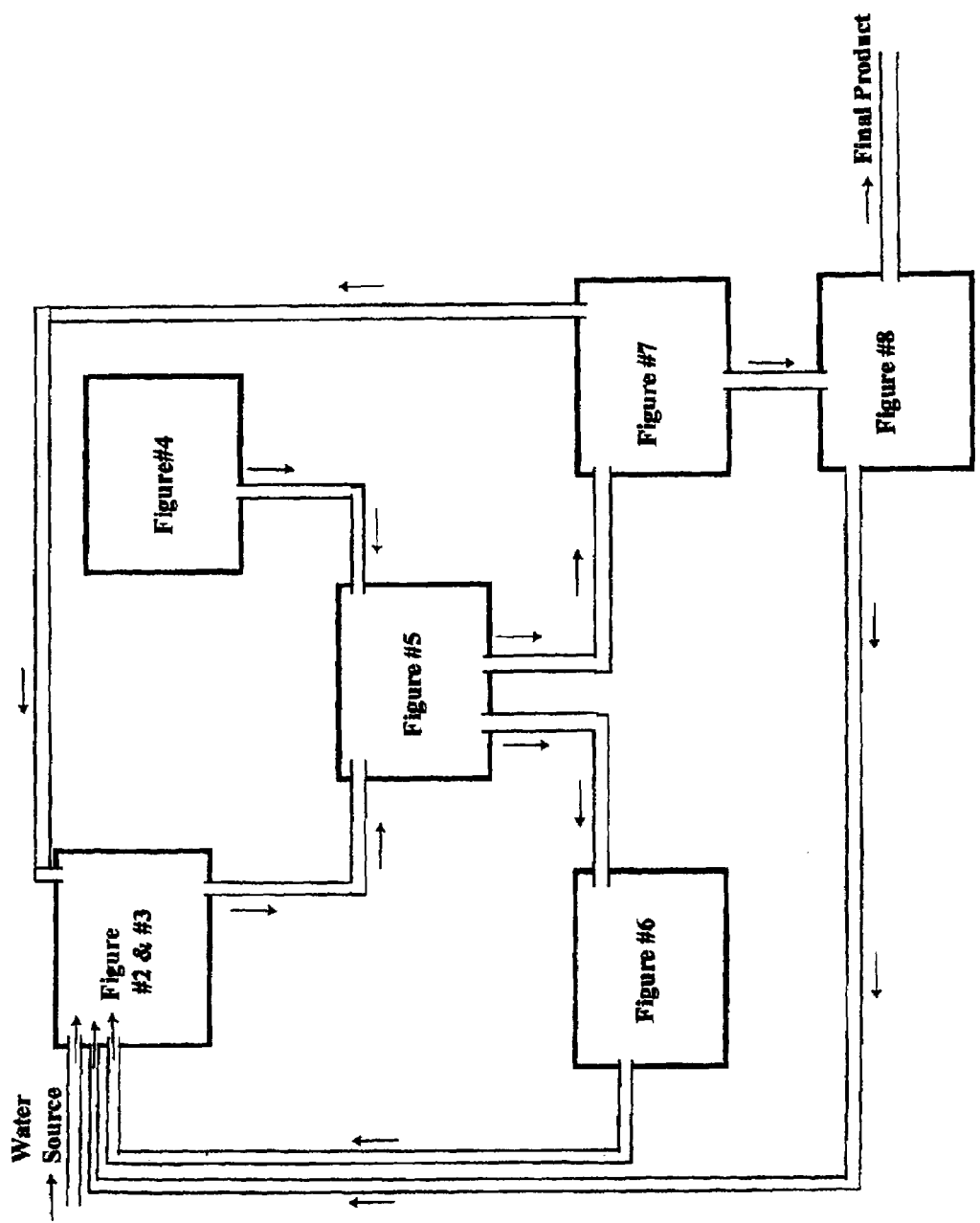

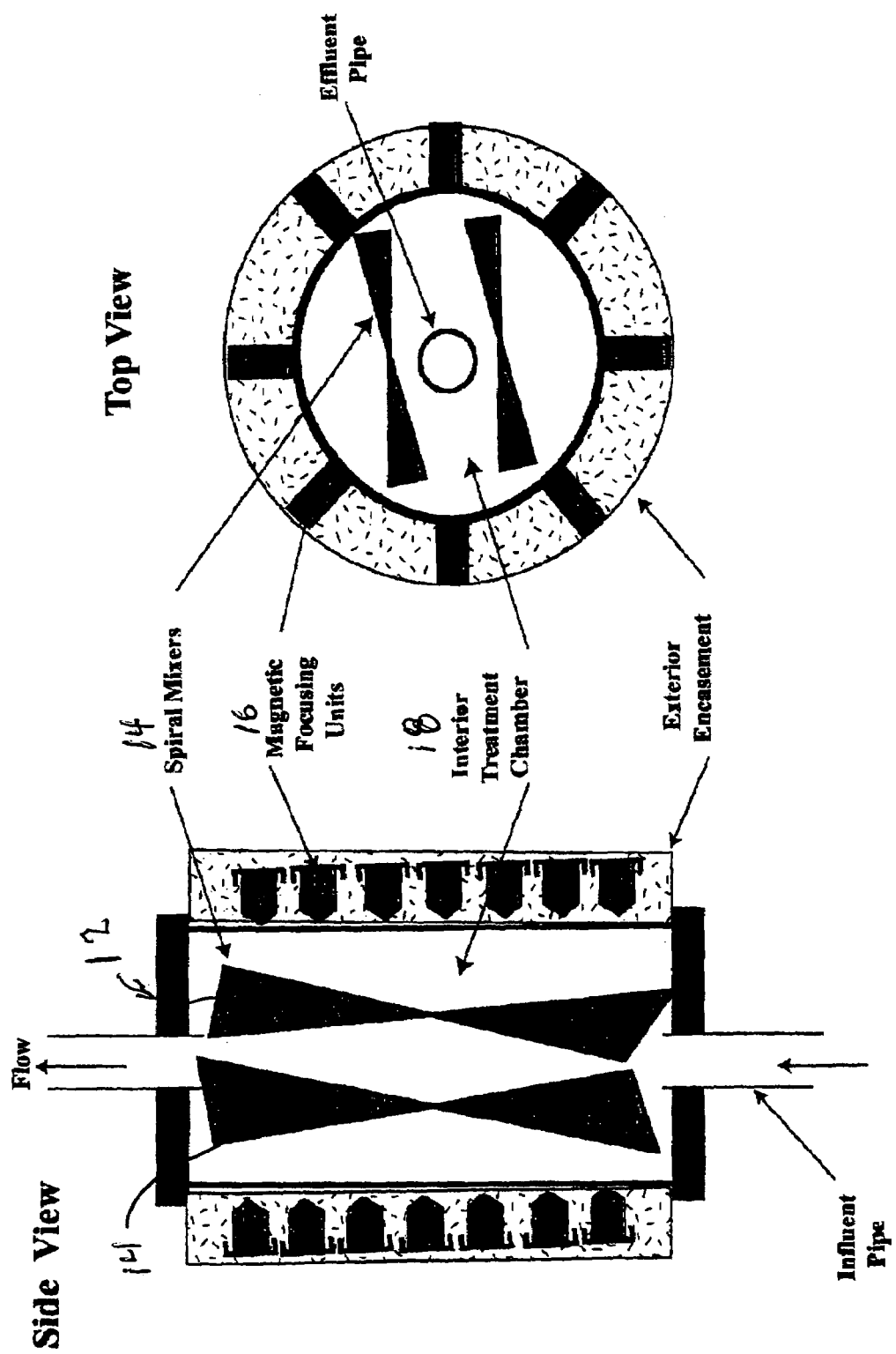

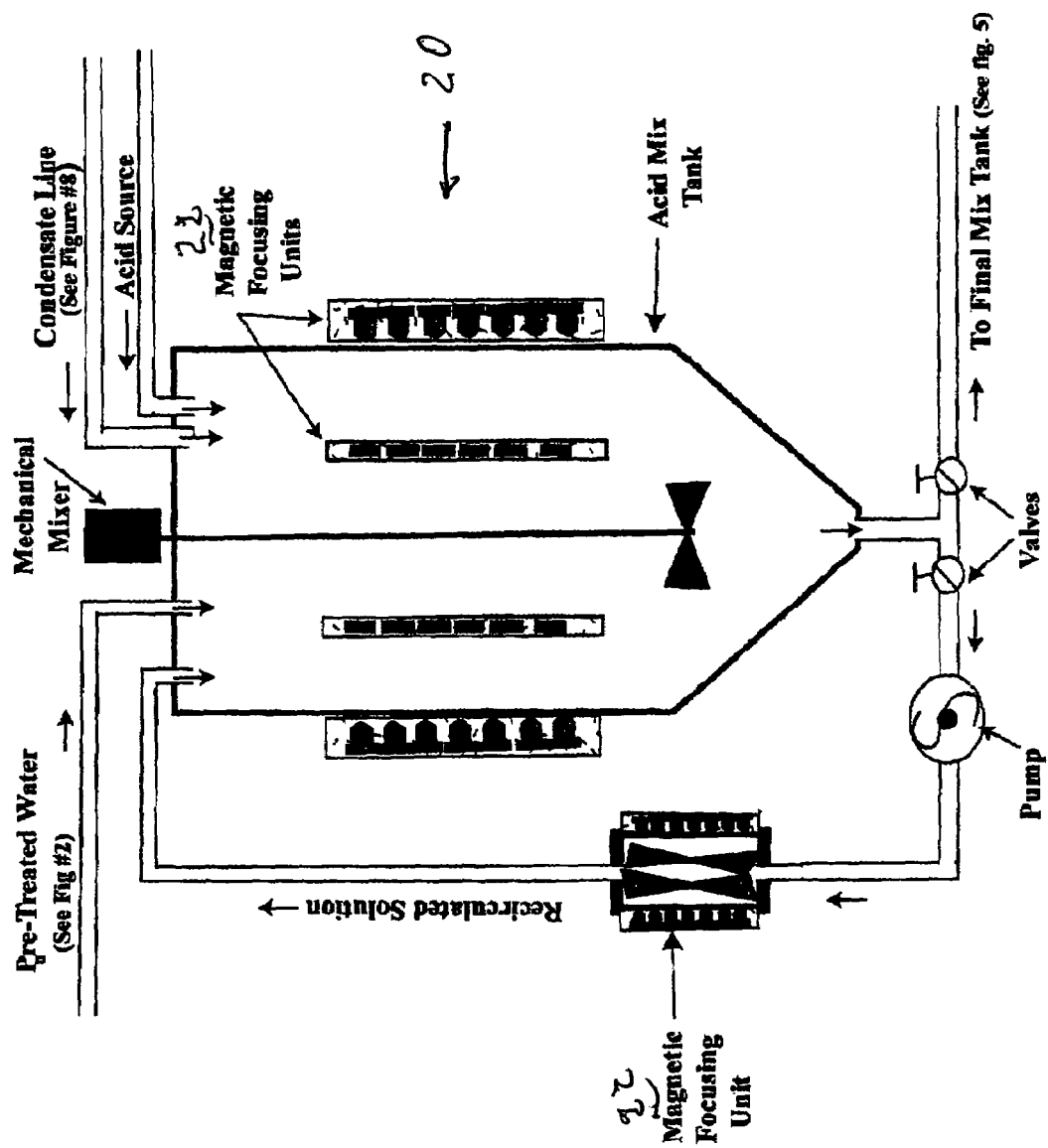
Figure #3

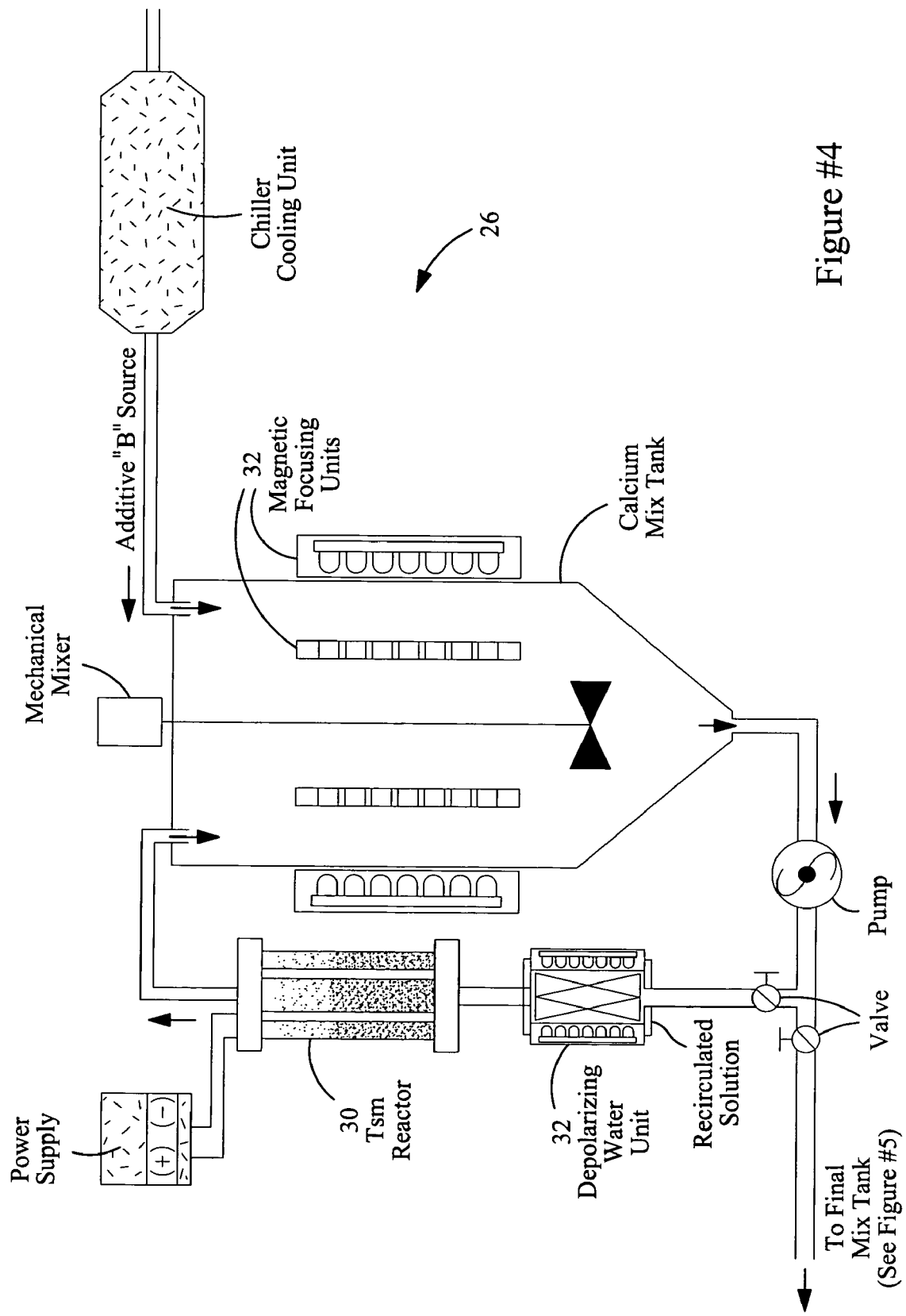
Figure #4

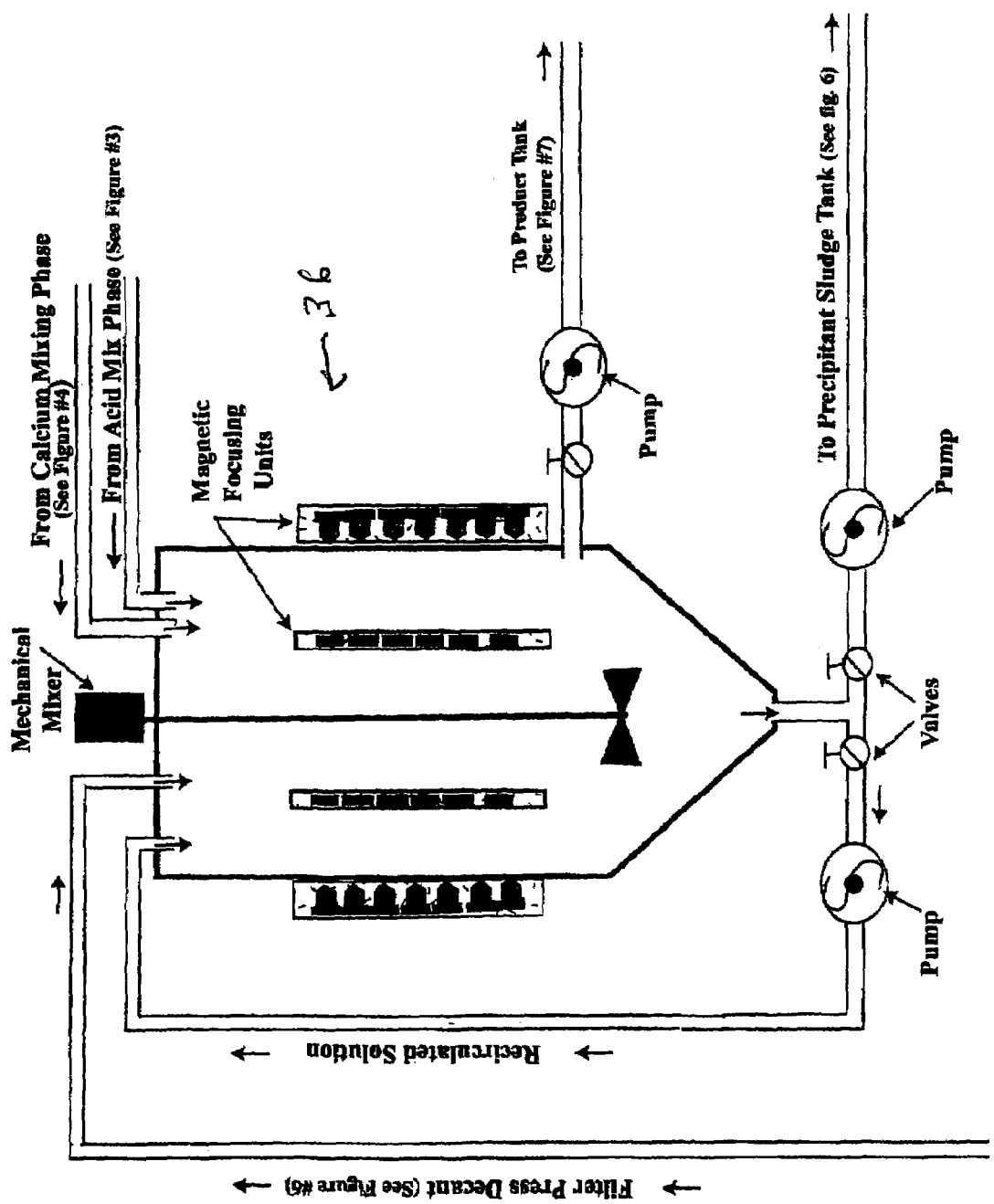
Figure #5

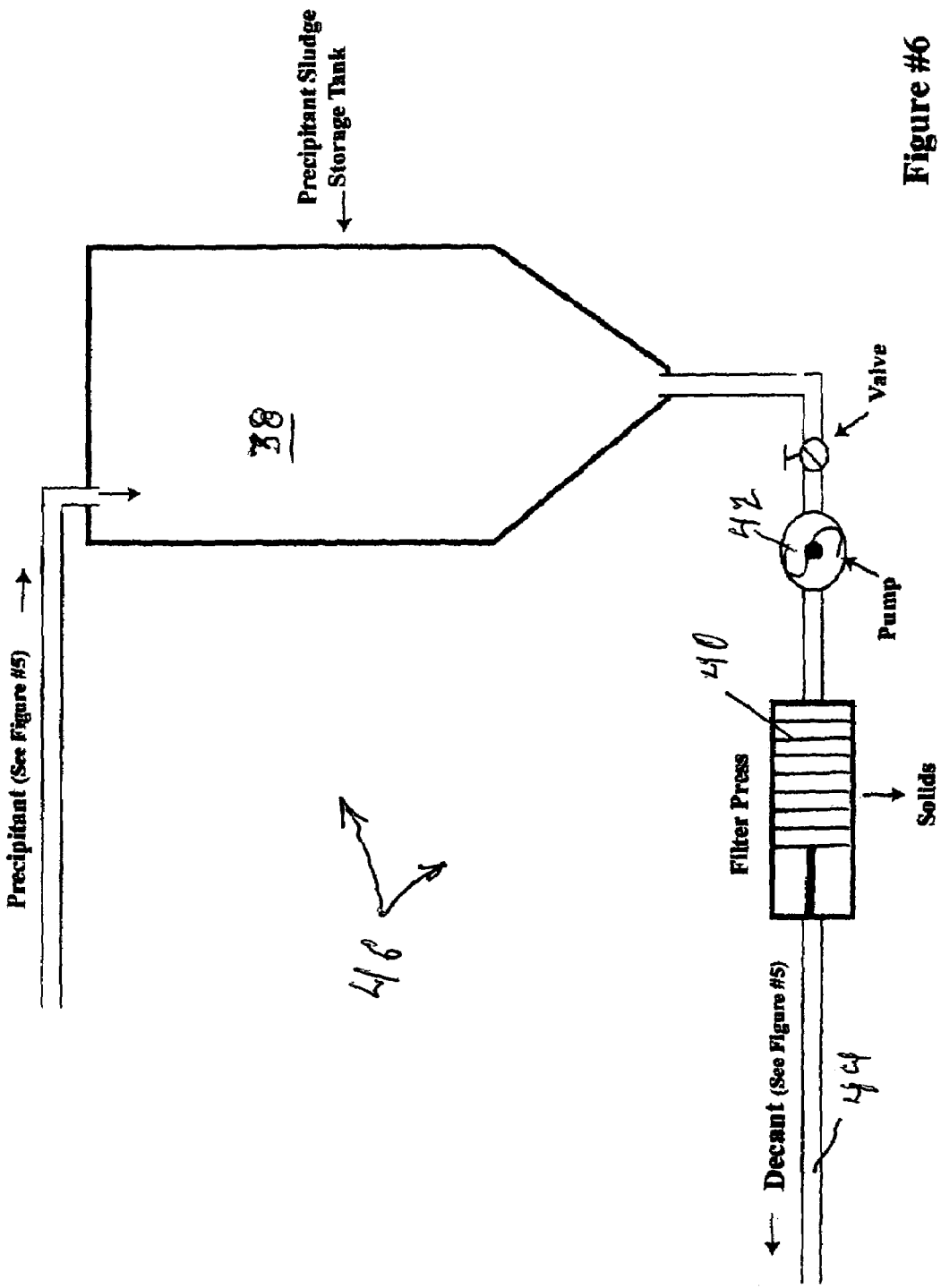
Figure #6

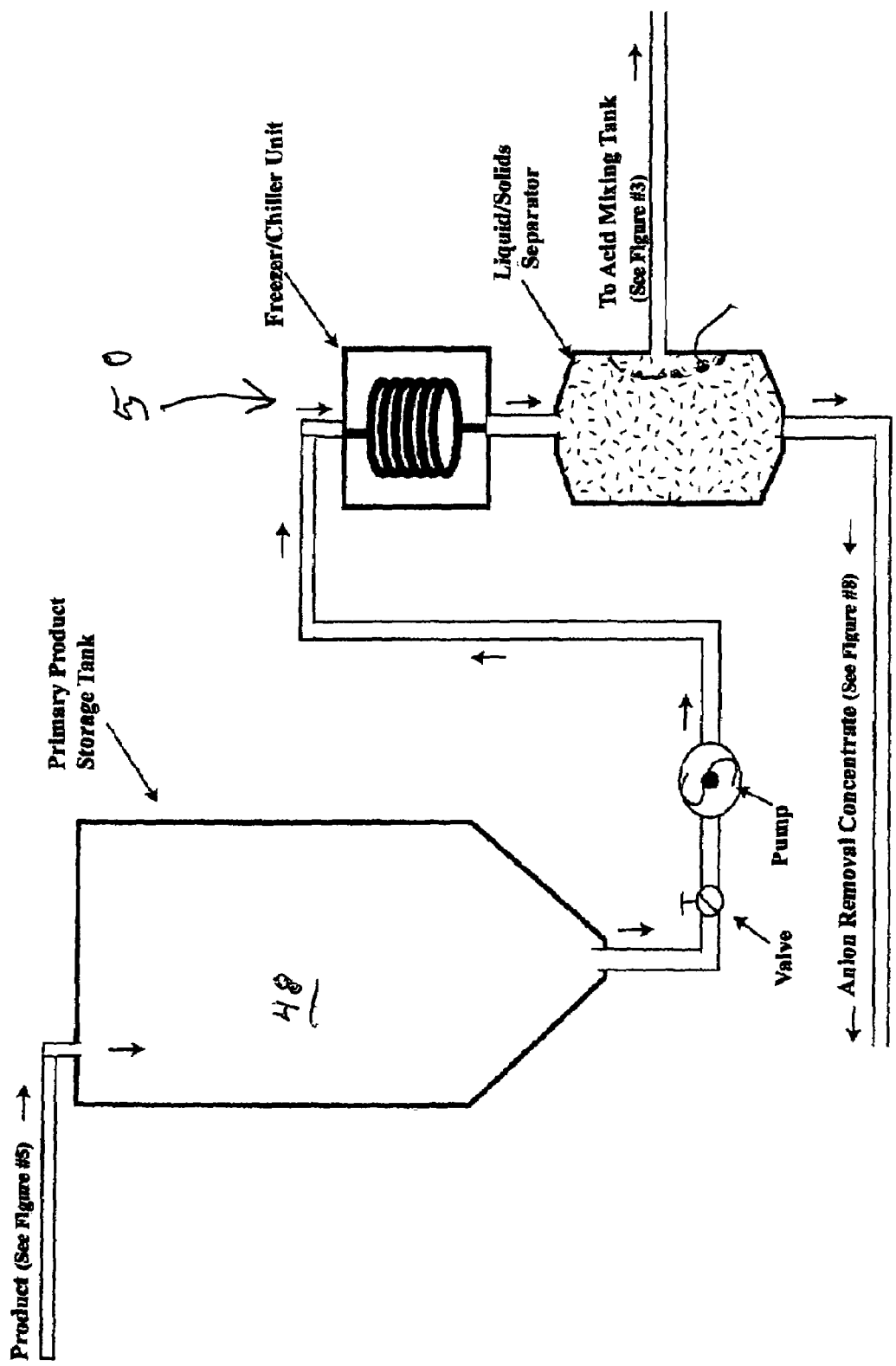
Figure #7

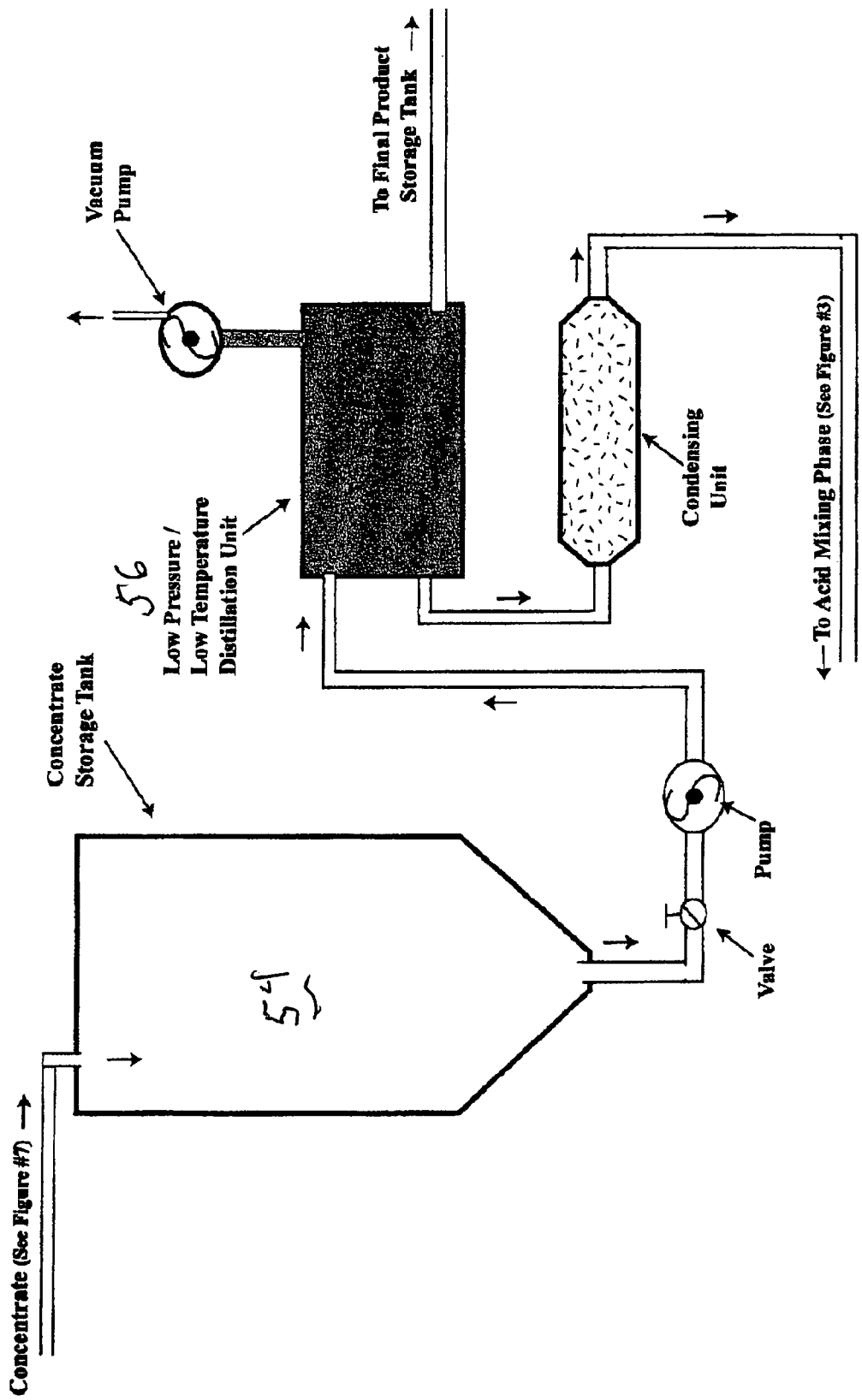
Figure #8

FIG. 9

1. AGITATE WATER TO REDUCE WATER CLUSTERS

2. ADD IN SULFURIC ACID PROVIDING SOLUTION A

3. PREPARE CA++ SOLUTION AND CONVERT CA++ TO CA+++ PROVIDING SOLUTION B

4. ADD SOLUTION B TO SOLUTION A

5. ADD SURFACTANT TO PROMOTE PRECIPITATION

6. SETTLE AND FILTER OUT PRECIPITATED CA SULFATE

7. FREEZE TO SLUSH AND FILTER OUT ICE PROVIDING LIQUID

8. DISTIL OFF FREE WATER FROM LIQUID LEAVING $H_9O_4^+$

HIGH MOLECULAR WEIGHT IONIZED WATER

CROSS REFERENCE TO EARLIER APPLICATIONS

This application is a continuation-in-part of U.S. application Ser. No. 10/117,878 filed Apr. 6, 2002 now abandoned from which priority is claimed.

BACKGROUND AND INFORMATION DISCLOSURE

Water is well understood to be absolutely necessary for supporting all forms of life. It has been further understood that its unique properties have led to Its uses for many purposes. These properties include its thermodynamic properties, its powerful solvating characteristics, its electrical properties.

As the properties of water have been discovered and understood, mankind has developed new and improved uses for this ubiquitous compound.

The water molecule is very polar, resulting from its composition of two hydrogen atoms bound by exchange force to the oxygen atom.

Interaction between molecules results from hydrogen bonding in which a hydrogen ion from one molecule is attracted to an oxygen ion of another molecule. The interaction is further modified by van der Waal forces in which each ion of a molecule induces a modification of the dipole moment of a neighboring molecule.

These interactions confer the recently discovered property of clustering on the structure of "liquid water". According to these investigations, normal water generally exists as clusters of water molecules. A cluster in typical water is about thirteen microns diameter but can vary, depending on treatment of the water.

Variations of rheological properties of water have been attributed to variations in the size of the water clusters. Control of cluster size would be expected to have practical significance especially in medical situations where surface tension, as it relates to permeability, is significant.

Hydronium ions. ($H_3O^+$) are known to exist in acid solutions such as HCL where the concentration of $H_3O^+$ ions are balanced by an equal concentration of (e.g.,) $Cl^-$ ions.

Oxonium ions ($OH^-$) are known to exist in "base" solutions such as NaOH where the concentration of $OH^-$ ions are balanced by an equal concentration of $Na^+$ ions.

In many processes involving acids and bases, the accumulation of anions in acidic reactions and cations in basic reaction, generate an environment that must be 'cleaned up" after the compounds have served their respective purposes.

In recent years, it has been discovered that hydronium ions can be generated in otherwise pure water (called "acid" water) without the presence of anions. Similarly, it has been discovered that oxonium ions can be generated in otherwise pure water (called herein "base" water).

Acid water and base water are produced by electrolysis. The electrolysis apparatus comprises a filter positioned between a platinum cathode and platinum anode in a container of water The "Acid water" has a high oxidation potential compared to an acid solution of an acid such as hydrochloric acid having the same pH. For example, an "acid water" solution having a pH of 4.0 has an oxidation potential of 500 mv. whereas a mineral acid solution, HCL, having the same pH has an oxidation potential of only 250 mv.

The "Base water" produced by electrolysis, has a large reduction potential compared to a base solution having the same pH. For example, a base such as sodium hydroxide having pH=9 has a reduction potential of about −250 mv whereas "base water" produced by electrolysis and having a pH=9.0 has a reduction potential of about −500 mv.

Base water and acid water produced by electrolysis have useful properties in their own right. A major advantage of these "ionized waters" in their respective applications is that the hydronium ion and oxonium ions exist in water that is pure.

For example, acid water is a powerful antiseptic. Yet it is not corrosive to human flesh when the applied acid water has a pH that is low enough to kill bacteria. In comparison, mineral acids having the same pH is highly corrosive to human flesh due to the presence of the $Cl^-$ ion.

Base water is a powerful antioxidant. Drinking base water for the purpose of reducing acidosis does not lead to the undesirable effect of excessive accumulation of the cation (for example Na or Mg).

A problem with acid water and base water in their respective applications is that they have a shelf life of only a few hours.

U.S. Pat. Nos. 5,571,336 and 5,830,838 have disclosed chemical processes for generating very stable acid water and base water by chemical processes. These two patents are incorporated herein by reference.

A systematic theoretical investigation of hydrated structure and thermos-chemical properties of hydrated protons is disclosed by Yang So Kim et al (Journal of Chemical Physics, Aug. 26, 2002. the lifetime of these hydrated proton clusters is hypothesized to be of the order of nanoseconds.

Three hydrations of the $H_3O^+$ ion are hypothesized, according to which:

a $H_3O^+$ with a single water of hydration is $H_5O_2^+$;

a $H_3O^+$ ion with two waters of hydration has a chemical configuration of $H_7O_3^+$;

a $H^3O+$ ion with three waters of hydration has the chemical configuration $H_9O_4^+$.

The paper predicts two distinct molecular configurations for $H_9O_4^+$.

One configuration is a first solution cage (hydration cage) arranged in C3 symmetry.

The second configuration is a hydrogen ion with the hydrogen bonded between two water molecules and the remaining two water molecules attached to opposite sides of the two centered water molecules. This arrangement gives a horizontal saw tooth pattern.

"Hydrogen Bonding" by Vinogradov and Linnel. pp 216-217, 1971 presents a theoretical model of the hydrated proton in an aqueous solution. The structure of H9O4+ is disclosed. A second hydration shell (H15O7) is also disclosed. They hypothesize that the symmetrical distribution of the excess positive charge among the three protons in the primary hydration of H+ enables the formation of a very stable H bond with neighboring water molecules (FIGS. 8-11). This secondary hydration results in $H_9O_4^+$ complexes whose proton possesses a very high mobility within the molecular complex. They predict that the mean period of association of a proton with a given water molecule is $10^{-12}$ seconds.

It is apparent that a method for producing a form of water having increased molecular weight would have useful application in processes where water is a key ingredient, particularly in electrolytic, medical and energy producing processes.

SUMMARY OF THE INVENTION

It is an object of this invention to provide a process for producing a liquid compound being a "tri-solvated" hydronium ion represented as $H_9O_4^+$. It is contemplated that this compound be provided in a form that has a minimum amount of "free" water.

It is another object of the invention to provide a solution that replaces mineral acids in many applications where high oxidation potential is desired and inclusion of anions is prevented.

This invention is directed toward a process for creating $H_9O_4^+$ in a series of steps which include:

reducing the natural cluster size of water by mechanical means;

forming a solution A by adding reagent grade sulfuric acid to the "declustered" water;

forming a solution B of Ca compound, being one of hydroxide, carbonate, oxide, or calcium metal dissolved in water and ionizing the Ca to Ca3+ state by a known "ion state modification" treatment.

adding solution A to solution B and removing the precipitated calcium sulfate;

cooling the mixture of solutions A and B resulting in formation of an icy slush;

filtering out the slush (removing ice) leaving a liquid concentrate that is a mixture of "free" (normal) water and trisolvated water $(H_9O_4)^+$.

removing the free water by vacuum distillation;

BRIEF DESCRIPTION OF THE DRAWINGS

FIG. 1 is a block diagram of the system of components for carrying out the method of the invention.

FIG. 2 is a diagram of the magnetic water pretreatment unit.

FIG. 3 shows the water/acid mixing unit.

FIG. 4 is a diagram of the calcium mixing section and the $Ca^{+3}$ conversion unit.

FIG. 5 shows the final mixing tank.

FIG. 6 shows the sludge removal system.

FIG. 7 shows the secondary anion removal water reducing system.

FIG. 8 shows the final water removal apparatus.

FIG. 9 is a flow chart of the method of this invention.

DESCRIPTION OF THE BEST MODE

Turning now to a description of the drawings, FIG. 1 is a block diagram illustrating the steps of the process for generating the product of this invention.

FIG. 9 is a flow chart listing the steps for producing the H9O4+ compound of this invention.

In step 1, a non-magnetic mixing tank 10 is filled with water. FIG. 2 shows the tank 12 is provided with a high speed low volume centripetal pump (not shown) that recirculates the water through an interior treatment chamber 18 with the aid of spiral mixers 14 in the tank 12 through a "mono-polar" magnetic treatment unit having magnets 16 generating at least two million gauss as disclosed in U.S. Pat. No. 5,380, 430 incorporated herein by reference. (In the context of this specification, circulating the water through a "mono-polar" magnetic treatment unit is equivalent to circulation through a region of negative magnetic field gradient.) The water is recirculated for a period of at least 45 minutes, or, for larger tanks, up to four hours depending on the size of the tank.

In step 2, FIG. 3 shows a mixing tank 20 where sufficient quantity of reagent grade sulfuric acid (93%) is added to the water to provide a solution of 3.0 molarity. The acid water mixture (solution A) is recirculated in the presence of a magnetic field provided by magnetic focusing units 22 sufficiently long to ensure that dissociation of the sulfuric acid reaches equilibrium In step 3, FIG. 4 shows a system 26 for preparing a second solution (solution B) being ⅔ molarity of Ca compound. The preferred compound is any one of calcium oxide, calcium hydroxide, calcium hydride, calcium carbonate or calcium metal.

Preparation of the Solution B includes chilling the solution with compound to promote solubility of the compound. The chilling unit 28 is shown.

The calcium containing solution is circulated through an "ion-state-modification unit 30 and units 32 for generating a monopolar magnetic field for about one to two hours. This unit is an electro-oxidation unit cited previously in U.S. Pat. No. 5,380,430. The function of the reactor is to oxidize the Ca2+ ion to Ca3+. Circulation lasts for one to two hours depending on the volume of the batch and solubility of the Ca compound. Step 3 produces a second solution, solution B.

In step 4, FIG. 5 shows a separate tank 36 for adding a volume of solution B equal to one fifth the volume of solution A. Addition of solution B to A while stirring is performed at a rate to prevent the rise in temperature of the reacting solutions to where the temperature would reduce the solubility of the Ca compound.

In step 5, the solution is permitted to cool to a moderate temperature where an amount of anionic surfactant is added in sufficient amount to precipitate colloidal and subcolloidal particles from the solution.

In step 6 after the sulfate reaction goes to completion, the solution is transferred to a settling tank 38 shown in FIG. 6, There is no mechanical agitation so that the calcium sulfate is enabled to settle. Sludge accumulated in the bottom of the mixing tank 38 is removed.

In an optional addition to step 5, the accumulated sludge may then be put through a filter press 40 by pump 42. The filtrate 44 from the removal unit 46 is pumped back into the final mix tank 36. The decant from the final mix tank is pumped into a holding tank (not shown) for reuse in the starting solution.

In step 7. As shown in FIG. 7 the solution from the holding tank 48 is then put through a batch or continuous freezing system 50 where the solution is frozen to slush. The slush is then poured through a screen 52 (20 mesh) where liquid solution C is separated from ice and poured into a second holding tank.

In step 8, solution C is placed in a (holding tank 54 for batch or continuous flow) and then through a low pressure distillation unit 56 where all the remaining unbounded water is removed from solution C.

Water distilled in the distillation unit 56 is passed through condensing unit 58 and the condensed water is sent back to the acid mixing tank 20.

The remaining liquid, D, is the $H_9O_4^+$ concentrate as confirmed by the following tests:

A 2 liter batch of freezer concentrate was sent to chemical department at the Univ. of Nevada, Reno. The liquid was subject to low temperature-low pressure condition to drive off virtually all of the free (unbound) water molecules. Approximately 65 mls of oily liquid remained. This liquid was tested for acidity and specific gravity. It was found to have an acid content equal to 19.7 acid normality and a specific gravity of 1.521.

A sample of the oily liquid was shipped to the Chemistry Department, Texas A. and M., Prairie View campus and the following calculations were used to identify the oily liquid having a very great concentration of $H_9O_4^+$ solution:

A summary of the method for determining the molecular composition of the oily liquid is based on assuming that one hydronium ion is associated with each molecular complex (assemblage of $H_2O$ groups being a molecule $H_9O_4^+$)

The normality, N, measured by titration is used to compute the number n of hydronium ions in a given volume. n times 1 amu equals the weight, w, of the hydronium ions in the volume. Weight, W, of the volume divided by the weight of H2O gives the number n' of H2O groups in the volume. Then the hydration number of the liquid, (number of $H_2O$ groups per each hydronium ion) is n'/n Molecular mass is the sum of the masses of the atoms represented in a molecular formula. The molecular mass has the same numerical value as the molar mass for a given compound. For example, the molecular mass of water is 18 amu (atomic mass units)/molecule of water and the molar mass is 18 grams/mole water. One mole of water=$6.02 \times 10^{23}$ molecules of water.

The molecular mass of the oily liquid (99.9% water free) is determined as follows:

Specific gravity=1.521 (as reported above) and the molarity (M) is 19.7 M (by titration.

By definition, molarity (M) equals the moles of solute (acid) per liter of oily liquid.

The moles of acid molecule appear in the following:

Molarity of acid=(moles acid)/1.0 L acid and (by definition)

Moles acid=[(grams acid)/MM acid]/1.0 L acid

Rearrange:

$$MM \text{ acid} = [\text{grams acid}]/M \times 1.0 \text{ L} \qquad \backslash A.$$

The value of M=19.7.

The value of grams acid is obtained from specific gravity. Equation \A is then solved for MM.

The specific gravity is the ratio of mass/volume or water where the volumes are equal.

Specific gravity=1.521
={[grams acid/ml]/gms water/mL}
=[grams acid]/0.99823 g/mL
0.99823 g/mL=density of water at 20° C.
Density of acid=1.521×0.99823=1.509 g/ml.
Therefore 1.0 L acid=1.509 g acid (99.9% water free)
Grams acid (100% water free) is obtained as follows:
Gram acid=1.509 g×0.999=1.507 g pure acid
Finally,
MW acid=1,507 g acid/19.7 M×1.0 L
Where M=moles/L
Giving:
MM acid=76.5 g/m or 76.5 amu/molecule.

The acid value of $H_9O_4^+$ is 73.1 g/mole/

These results support the conclusion that the oily liquid product is $H_3O_4^+$.

The $H_9O_4^+$ concentrate has been found to have a long shelf life of several years.

While I do not wish to be bound by theory, it is believed that the success of the process depends on establishing favorable conditions to bring about the complete dissociation reaction:

$$H_2SO_4 + 2H_2O \rightarrow SO_4^- + 2H_3O^+.$$

The environment must also be conducive to the solvation of $H_3O^+$ to stable $H_9O4^+$.

After stabilization, a series of chemical processes are used to reduce the SO4- concentration to very low levels.

After removing the sulfate ion, well known mechanical processes are applied to remove the remaining water leaving the $H_9O_4^+$ concentrate.

The following four conditions are necessary for performing the process most efficiently:

8. The water is very pure.
9. The pure water must be first treated by either mechanical or magnetic means to reduce the size of the water clusters and thereby liberate free water molecules.
10. The acid (e.g., sulfuric) is very pure and has a large dissociation constant.
11. The acid/water mixture must be agitated during dissociation of the acid. It is believed that this action maintains the cluster size of the water at a minimum and thereby continuously generates free water molecules. The continuous supply of free water by the delustering step promotes the total dissociation of the $H_2SO_4$ into $2H_3O^+$ and $SO_4^-$ resulting in the eventual formation of stable $H_9O_4$.

The "de-sulfated" solution can now be treated with well known mechanical and chemical process to remove the remaining water so as to remove the remaining water and leave the $H_9O_4^+$ concentrate.

The composition of the present invention was used as a replacement for sulfuric acid and a conductivity enhancer in a water solution to be used in a H-Bar type of hydrogen generating electrolysis device. Results from preliminary tests show there was a 19% improvement in the generation of hydrogen as compared to salt water of the same conductivity. There was also a 16% reduction in the amount of power consumed to generate the prescribed volume of hydrogen.

EXAMPLE #1

600 gallons of pure water was placed in a non-magnetic mixing tank equipped with a mechanical mixer and a recirculating pumping system. A number of mono-polar magnetic focusing units are mounted on the outside of the mix tank. The mechanical mixer is designed to circulate the solution from the tank down to the bottom of the tank and then rise along the outside edges where the magnetic field is strongest.

After the water has been recirculated for twenty minutes, reagent grade (93%) sulfuric acid is added to the water to create a 3.0 molar solution. The acid-water mixture is recirculated for ten minutes to ensure that complete dissociation has occurred. The solution is next transferred to the non-magnetic final mix tank.

Two hundred gallons of pure water are placed in a second non-magnetic mix tank equipped with a mechanical mixer and a recirculating pump system. The recirculation system includes an ISM (ion-state-modification) electro-oxidation unit in line that is designed to oxidize Ca2+ ions to Ca3+ ions. Mono-polar magnetic focussing units are arranged around the tank to generate a 500 kgauss field within the tank.

A calcium compound in the amount of ⅔ acid equivalent is added to the water. The solution is recirculated until substantially all of the calcium has dissolved and oxidized.

The oxidized calcium mixture is chilled and added to the sulfuric acid solution in the final mix tank.

In the final mix tank, after all of the compound has been added, the reaction is permitted to go to completion.

After the reaction goes to completion, a small amount of anionic surfactant is mixed thoroughly into the solution.

The mechanical mixer is then turned off allowing calcium sulfate to crystallize and precipitate out of solution.

The decant from the final mix tank is transferred to the product tank. The sludge is transferred to the product tank. The sludge is removed from the bottom of the final mix tank and dewatered in a belt or filter press. The filtrate is then transferred to the product tank.

The solution from the product tank is placed in a batch or continuous freezing unit so as to create a frozen slush. The slush is placed in 20 mesh screen to separate liquid from ice. The ice is permitted to melt and the liquid is transferred to the acid mix tank for reuse.

The freezer concentrate (approximately 255 of the starting solution by volume) is placed in a continuous low pressure-low temperature distillation unit where the remaining water molecules are removed. The condensate is collected and returned to the acid water mix tank for reuse. The remaining liquid is the concentrated $H_9O_4^+$ liquid.

EXAMPLE #2

The same process of example 1 was repeated except that several batches of freezer concentrate are manufactured and combined. The combined solution is now frozen to a slush. The liquid remaining in the slush is separated from the ice by screening (20 mesh). The filtered solution can now be placed in a low temperature distillation unit to remove the remaining water. The condensate is collected and returned to the acid-water mix tank for recycling. The distillate produced is the concentrated $H_9O_4^+$

EXAMPLE #3

For certain uses it is unnecessary to create $H_9O_4^+$. For example, as a replacement for sulfuric acid as a battery electrolyte, the freezer concentrate has sufficient strength that the final distillation process is not necessary.

There has been described a system for generating a stable compound of H9O4+. Up to the present time, the presence of the compound has only been hypothesized to exist in an unstable, exceedingly short lived form. The advantage of its use to generate hydrogen has been demonstrated, showing that hydrogen can be produced from the compound using less energy than competing processes for generating hydrogen.

Its use as a replacement for sulfuric acid as a battery electrolyte is reported.

Its non-corrosive contact with human tissue suggest superior antiseptic performance.

Variations and modifications of the process for making the compound and its uses may be contemplated which are within the scope of the invention.

As examples, extensions of the method for making H9O4+ include the additional steps of using the liquid compound in a plurality of applications where it has advantages over water.

These applications include:

as a non-flammable non corrosive liquid that has a high concentration of hydrogen as fuel for a liquid fuel cell;

as a replacement acid for sulfuric acid as a battery electrolyte wherein the greater redox potential of the H9O4+ presents a greater battery voltage;

as a substitution for mineral acids in pH adjustments thereby avoiding the accumulation of anions associated with the mineral acids;

as a replacement for nitric acid and muriatic acids used in pretreating steps in electro- and electroless plating.

Biological applications of the product, based on its non reactive properties when contacting tissue, include it use as a disinfecting agent, food preservative, bactericide for *E-coli*, mold, mildew and fungal inhibitor, In view of these considerations, I therefore wish to define the scope of the invention by the appended claims.

What is claimed is:

1. A method for generating $H_9O_4^+$, said method comprising the steps in operable order:
   (i) subjecting pure water to at least one of mechanical agitation and magnetic perturbation;
   (ii) mixing reagent grade sulfuric acid in said pure water and agitating said reagent grade sulfuric acid in said pure water whereby an aqueous sulfuric acid solution is formed;
   (iii) adding a compound of calcium to pure water to form a solution of $Ca^{2+}$ ions in pure water;
   (iv) subjecting an aqueous solution of $Ca^{2+}$ ions to an electric field arranged to convert said $Ca^{2+}$ ions to $Ca^{3+}$ ions whereby a solution of $Ca^{3+}$ ions is generated;
   (v) mixing said solution of $Ca^{3+}$ ions with said aqueous sulfuric acid solution whereby $CaSO_4$ precipitates in a liquid are formed;
   (vi) removing said $CaSO_4$ precipitates from said liquid leaving a remaining liquid;
   (vii) lowering temperature of said remaining liquid to where a slush is formed, wherein said slush comprises ice and remaining liquid;
   (viii) passing said slush through a filter whereby said remaining liquid is separated from said ice;
   (ix) subjecting said remaining liquid to distillation whereby free water is removed from said remaining liquid leaving a liquid compound having a molecular formula $H_9O_4^+$.

2. The method of claim 1 wherein said step of subjecting said water to magnetic perturbation includes subjecting said water to a field from a monopolar magnet.

3. The method of claim 1 wherein said step of subjecting said water to magnetic perturbation includes subjecting said water to a strong magnetic field gradient.

4. The method of claim 1 wherein said step of subjecting said water to mechanical perturbation includes moving said water through a centrifugal pump.

5. The method of claim 1 wherein said step (iii) includes the step of preparing said aqueous solution of $Ca^{2+}$ ions by mixing a calcium compound in water contained in a non-magnetic mixing tank.

6. The method of claim 5 wherein said calcium compound is selected from a group of compounds which consists of calcium metal turnings, calcium hydrate, calcium oxide, calcium hydroxide, calcium phosphate dibasic, calcium sulfate, calcium carbonate.

7. The method of claim 5 wherein said step of mixing said calcium compound in water contained in said non-magnetic mixing tank includes the step of subjecting said calcium compound in water to a monopolar magnetic field.

8. The method of claim 5 wherein said step of mixing said calcium compound in water contained in said non-magnetic mixing tank includes the step of subjecting said calcium compound in water to a magnetic field gradient.

9. The method of claim 1 wherein said step (iii) includes the step of chilling said solution of $Ca^{2+}$ ions in water where by solubility of said calcium compound is increased.

10. The method of claim 1 wherein said step (vi) includes the step of allowing said Ca precipitates to settle after which said precipitates are removed by decanting and filtering said solution from said precipitates.

11. The method of claim 1 wherein said step (vi) of adding an anionic surfactant whereby precipitation and settling of precipitates is aided.

12. The method of claim 1 wherein ice collected from step (vi) is added to step (v) of a next cycle in the method for generating $H_9O_4^+$.

13. The method of claim 10 wherein said filter of step (viii) is a twenty mesh screen and step (viii) further includes:

forcing said decanted precipitates with water through a filter press whereby a cake of calcium sulfate is formed, usable as a soil pH modifier.

14. The method of claim 1 which includes after step (ix), an additional step, (x) being substituting said $H_9O_4^+$ compound as a replacement for hydronium ion in a group of applications which consist of pH adjustment, antiseptic solutions, liquid fuel cell, batteries having a sulfuric acid electrolyte and including as a replacement for nitric acid and muriatic acid in metal plating.

\* \* \* \* \*